(12) United States Patent
Wang et al.

(10) Patent No.: US 8,983,109 B2
(45) Date of Patent: Mar. 17, 2015

(54) WIRELESS EAR-HOOK HEADSET, FLEXIBLE TUBE STRUCTURE THEREOF, AND METHOD FOR MANUFACTURING THE FLEXIBLE TUBE STRUCTURE

(71) Applicants: Lite-On Electronics (Guangzhou) Limited, Guangzhou (CN); Lite-On Technology Corporation, Taipei (TW)

(72) Inventors: Chung-Ming Wang, New Taipei (TW); Che-Cheng Chang, Taipei (TW)

(73) Assignees: Lite-On Electronics (Guangzhou) Limited, Guangzhou (CN); Lite-On Technology Corporation, Taipei (TW)

( * ) Notice: Subject to any disclaimer, the term of this patent is extended or adjusted under 35 U.S.C. 154(b) by 0 days.

(21) Appl. No.: 13/961,041

(22) Filed: Aug. 7, 2013

(65) Prior Publication Data

US 2014/0334658 A1 Nov. 13, 2014

(30) Foreign Application Priority Data

May 8, 2013 (CN) .......................... 2013 1 0167502

(51) Int. Cl.
H04R 25/00 (2006.01)
(52) U.S. Cl.
USPC ...... 381/381; 381/384; 455/575.2; 174/113 R

(58) Field of Classification Search
USPC ................. 381/381, 382, 383, 384; 379/430; 455/575.2; 174/113 R, 74 R; 29/887
See application file for complete search history.

(56) References Cited

U.S. PATENT DOCUMENTS

| D619,124 S | 7/2010 | Clay | |
|---|---|---|---|
| 7,750,240 B2* | 7/2010 | Jiang et al. | 174/102 R |
| 2007/0184881 A1* | 8/2007 | Wahl et al. | 455/575.2 |
| 2009/0103762 A1* | 4/2009 | Ishida et al. | 381/378 |
| 2011/0051973 A1* | 3/2011 | Liu et al. | 381/370 |
| 2012/0125656 A1* | 5/2012 | Wei et al. | 174/103 |
| 2012/0168199 A1* | 7/2012 | McCullough et al. | 174/113 R |

\* cited by examiner

*Primary Examiner* — Tuan D Nguyen
(74) *Attorney, Agent, or Firm* — Li & Cai Intellectual Property (USA) Office

(57) ABSTRACT

A wireless ear-hook headset includes a flexible tube, a receiver and a transceiver. The flexible tube has a cable, a first fixing binder fixed on one end of the cable, a second fixing binder fixed on the other end of the cable, and an outer layer. The cable has at least one shapeable metallic wire, a plurality of signal wires and an insulating cover layer. The outer layer has two ends which are fixedly connected with the first and second fixing binders respectively and fully covering the cable. The receiver is connected to the first fixing binder of the flexible tube. The transceiver is connected to the second fixing binder of the flexible tube. The present invention also discloses the flexible tube structure and a method for manufacturing the flexible tube.

16 Claims, 5 Drawing Sheets

WIRELESS EAR-HOOK HEADSET, FLEXIBLE TUBE STRUCTURE THEREOF, AND METHOD FOR MANUFACTURING THE FLEXIBLE TUBE STRUCTURE

BACKGROUND OF THE INVENTION

1. Field of the Invention

The present disclosure relates to an wireless ear-hook headset, a flexible tube structure thereof, and a method for manufacturing the flexible tube structure; in particular, to a flexible tube structure which can be shaped by bending and transmits signals, a method for manufacturing the flexible tube structure, and a wireless headset having the flexible tube structure.

2. Description of Related Art

Bendable signal-transmitting devices on the market, such as the flexible tube portion of a Bluetooth ear-hook, are usually designed to match the shape of a human body, such as the curvature of an ear, so as to be worn on the human body (e.g. on an ear). The flexible tube portion must have a signal wire for connecting electronic units at its two ends, e.g. the ear plug portion and the master chip, and small-scale design to reduce discomfort during wearing. Current products only have flexible rubber material which can be bent but cannot be shaped. This type of earphone device cannot tightly and securely attach to the human body (ear), and cannot satisfy the high demands for ergonomics and stability of sports-type products.

Additionally, in order to secure the signal wire in the flexible-tube mold against the pressure encountered during injection molding, such that the signal wire does not shift toward an offset position at the surface of the product, a plurality of openings are usually formed at the surface of the product to provide fixing units access to the transmission wire for holding the transmission wire in place. However, this type of production affects the overall appearance of the product, e.g. U.S. Pat. No. D619124 regarding a wireless ear-worn microphone transmitter.

To avoid producing openings during injection molding that affect the overall appearance of the product, an alternative method is to manually pass the signal wire through a hollow flexible-tube. This method requires a larger amount of human labor and production speed of the same is slower.

Hence, the present inventor believes the above mentioned disadvantages can be overcome, and through devoted research combined with application of theory, finally proposes the present disclosure which has a reasonable design and effectively improves upon the above mentioned disadvantages.

SUMMARY OF THE INVENTION

In order to achieve the aforementioned objects, according to an embodiment of the present disclosure, a wireless ear-hook headset is provided, including a flexible tube, the receiver and a transceiver. The flexible tube includes a cable, a first fixing binder fixed to one end of the cable, a second fixing binder fixed to the other end of the cable, and an outer layer. The cable has at least one shapeable metal wire, a plurality of signal wires proximal to the metal wire, and an insulating cover layer enclosing the signal wires. The outer layer has two ends respectively fixed to the first fixing binder and the second fixing binder and encloses the cable. The receiver is connected to the first fixing binder of the flexible tube. The transceiver is connected to the second fixing binder of the flexible tube.

In order to achieve the aforementioned objects, according to an embodiment of the present disclosure, a flexible tube which can be shaped by bending and transmits signals is provided, including a cable, a first fixing binder fixed to one end of the cable, a second fixing binder fixed to the other end of the cable, and an outer layer. The cable has at least one shapeable metal wire, a plurality of signal wires proximal to the metal wire, and an insulating cover layer enclosing the signal wires. The outer layer has two ends respectively fixed to the first fixing binder and the second fixing binder and encloses the cable.

In order to achieve the aforementioned objects, according to an embodiment of the present disclosure, a method for manufacturing a flexible tube is provided, including the following steps:

Providing a cable, including at least one metal wire disposed at the center of the cable, a plurality of signal wires proximal to the metal wire, and an insulating cover layer enclosing the signal wires;

Fixing a first fixing binder to one end of the cable;

Fixing a second fixing binder to the other end of the cable;

Bending the cable according to a predetermined curvature shape;

Fixedly disposing the first fixing binder and the second fixing binder into a flexible-tube mold; and Injecting melted material into the flexible-tube mold to form an outer layer enclosing the cable and partially enclosing the first fixing binder and the second fixing binder.

The present disclosure has the following advantages. The production method of the flexible tube structure of the present disclosure does not blemish the appearance of the product. A flexible tube structure which can be shaped by bending and transmits signals, and a wireless headset having the same, can be produced in limited space. The flexible tube structure and a wireless headset having the same are relatively more stable and secure than those made by conventional methods.

In order to further the understanding regarding the present disclosure, the following embodiments are provided along with illustrations to facilitate the disclosure of the present disclosure.

DETAILED DESCRIPTION OF THE PREFERRED EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings.

Figure 1:
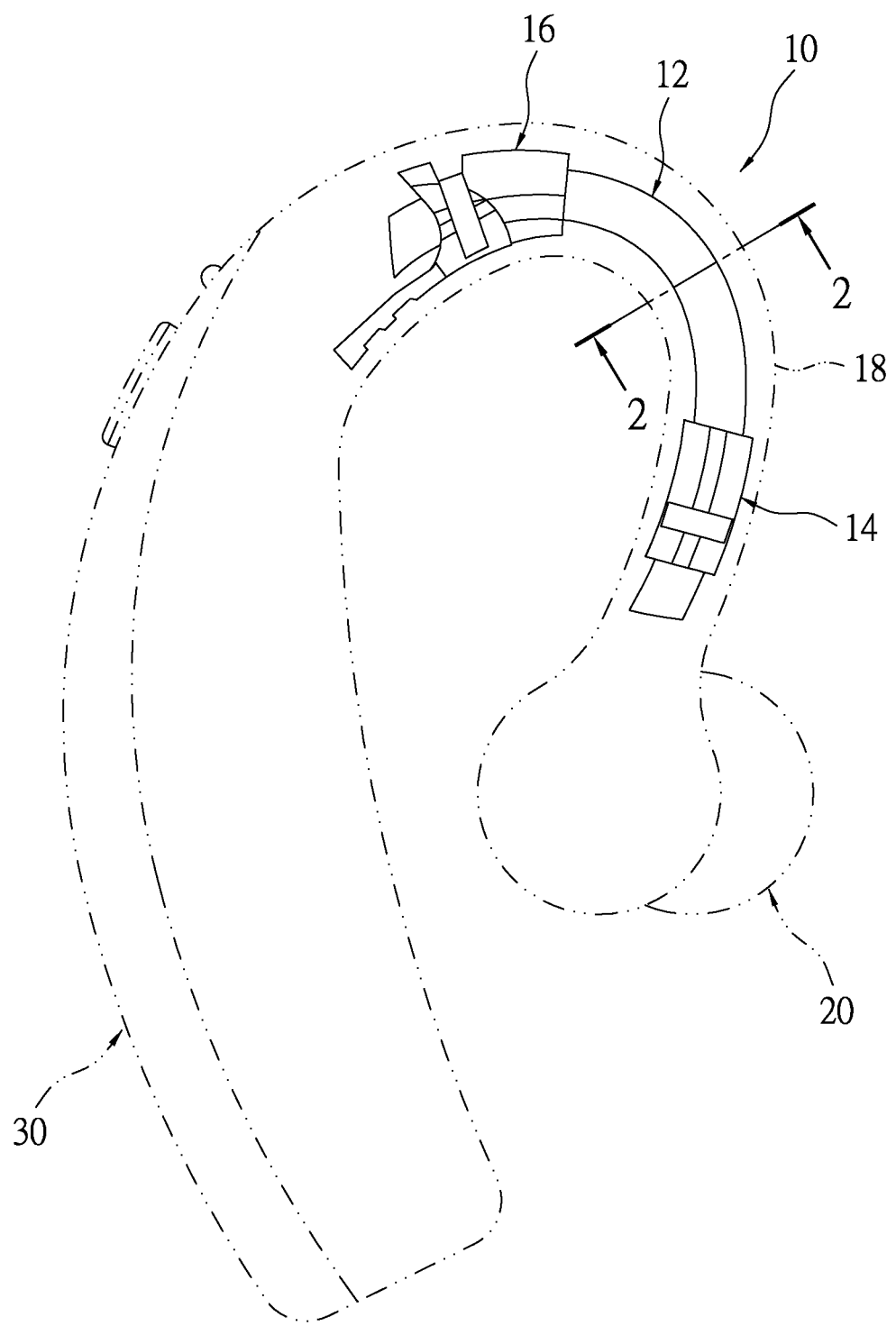
FIG. 1 is a schematic diagram of a wireless ear-hook earphone according to the present disclosure.

FIG. 1 is a schematic diagram of a wireless ear-hook earphone according to the present disclosure. The wireless ear-hook headset of the present disclosure includes a flexible tube 10 for hooking onto an ear of the user, a receiver 20 connected to one end of the flexible tube 10, and a transceiver 30 connected to the other end of the flexible tube 10. The wireless technology can be Bluetooth technology but is not limited thereto. The transceiver 30 includes a master chip, a transmitting module, etc. for transmitting and receiving signals.

Figure 2:
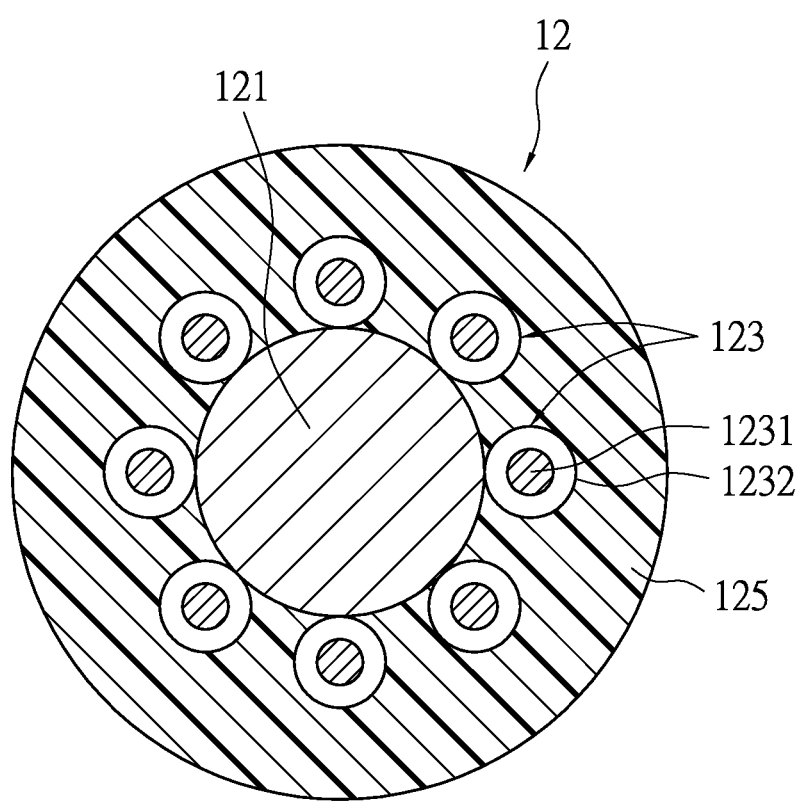
FIG. 2 is a cross-sectional view along line 2-2 of FIG. 1 showing the interior structure of the cable.

Refer to FIGS. 1 and 2. FIG. 2 is a cross-sectional view along line 2-2 of FIG. 1 showing the interior structure of the cable 12 (not including the outer layer delineated by the dashed lines in FIG. 1). The flexible tube 10, also named the ear-hook portion, includes a cable 12, a first fixing binder 14 fixed to one end of the cable 12, and a second fixing binder 16 fixed to the other end of the cable 12. The receiver 20 is connected to the first fixing binder 14 of the flexible tube 10. The transceiver 30 is connected to the second fixing binder 16 of the flexible tube 10. The cable 12 transmits signals between the receiver 20 and the transceiver 30.

A feature of the present disclosure is the structure of the cable 12. Referring to FIG. 2, the cable 12 has a shapeable metal wire 121, a plurality of signal wires 123 disposed at the periphery of the metal wire 121, and an insulating cover layer 125 enclosing the signal wires 123. The metal wire 121 of the present embodiment is disposed at the center of the cable 12, and amount to at least one. The signal wires 123 are proximal to the metal wire 121. Referring to FIG. 1, the outermost portion of the flexible tube 10 includes an outer layer 18. The outer layer 18 has two ends respectively fixed to the first fixing binder 14 and the second fixing binder 16, and encloses the cable 12. The metal wire 121 can be bare and unprotected by an insulating sleeve, and does not necessarily transmit signals, namely acting as a dummy line. Alternatively, the metal wire 121 can be designed as an antenna for receiving wireless signals. Each of the signal wires 123 includes a signal-wire conductive core 1231 and a signal-wire insulating layer 1232 enclosing the signal-wire conductive core 1231, for providing transmission. The quantity of the signal wires 123 can vary according to the amount of signals transmitted. The signal-wire insulating layers 1232 insulate the signal wires 123 from the metal wire 121. The insulating cover layer 125 packs the metal wire 121 and the signal wires 123 into a composite-material wire.

The metal wire 121 is shapeable in the sense that it can maintain a predetermined shape. For example, the metal wire 121 can be a bare copper wire, bare iron wire or steel wire having a definite diameter. Depending on the bending strength required, metal wires of different diameter and material can be used. For example, a copper wire between 1 mm and 2 mm has a particular ductility, such that it can be adjusted by bending to keep a predetermined curvature shape. Additionally, the overall diameter of the cable 12 preferably does not exceed 3 mm. In the present embodiment, the predetermined curvature shape is determined according to the shape of the human ear. In an embodiment, the metal wire 121 can be made of a shape memory alloy (SMA), shaped into a predetermined shape, and return to the original shape after being heated. This quality facilitates the present embodiment to maintain a predetermined shape during the production process.

One of the advantages of the present disclosure is that the cable 12 can be designed into a desired shape conforming to the shape of the human ear through influence of the metal wire 121. Conventional techniques only use flexible material which can be bent but is not shapeable and cannot tightly adhere to and be stably attached to the human ear. The shapeable quality of the present disclosure is suitable for sports electronic products, e.g. sports ear-hook headset, meeting the high demands for ergonomics and stability.

Figure 3:
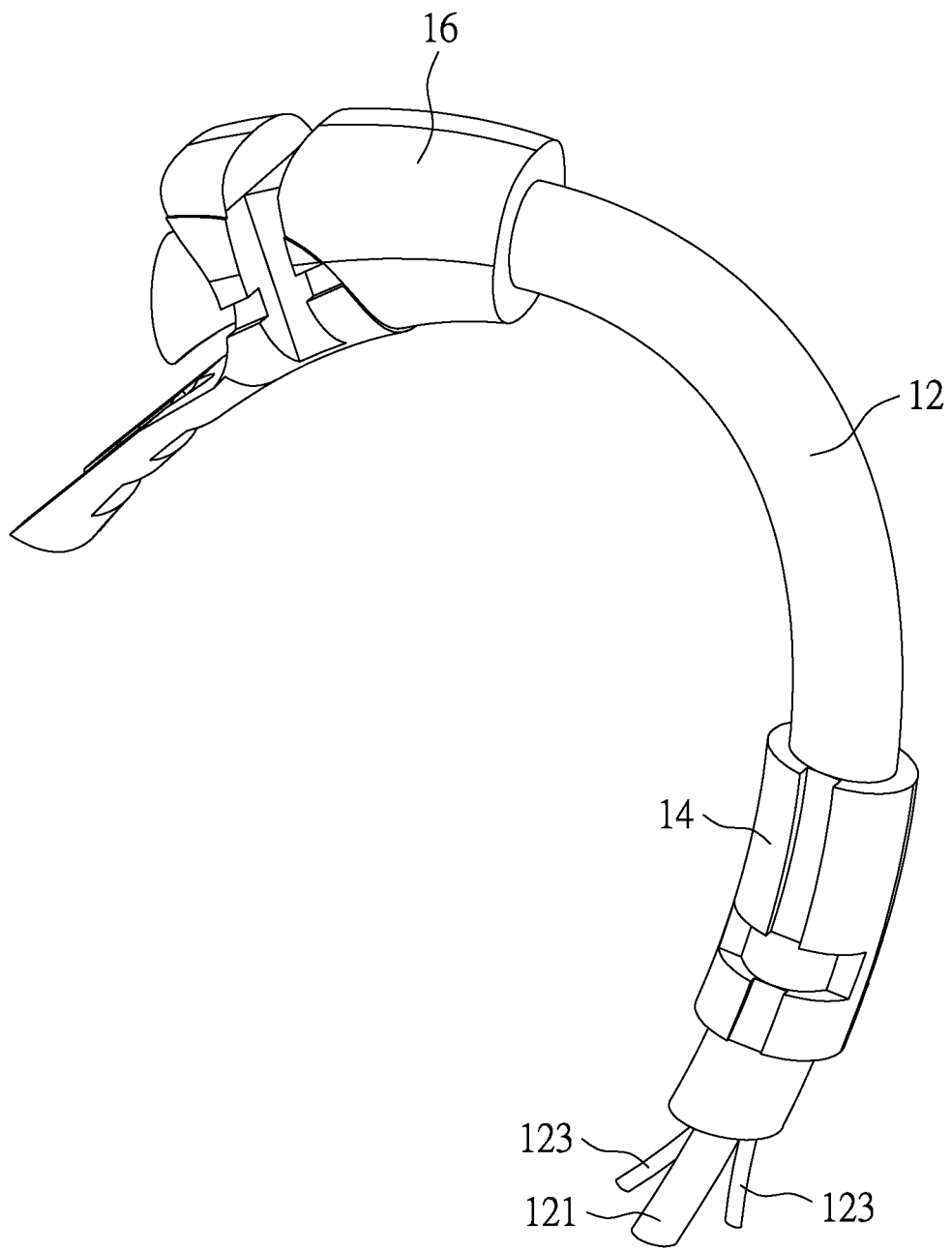
FIG. 3 is a schematic diagram of the flexible tube structure prior to injection molding according to the present disclosure.

The present disclosure further utilizes the structure of the cable 12 having the metal wire 121 to achieve a method of manufacturing the flexible tube structure, which overcomes the defect of having openings on the surface of products made by conventional techniques. The method of manufacturing the flexible tube includes the following steps:

As shown in FIG. 3, a cable 12 is provided. The structure of the cable 12 is as described above, including a shapeable metal wire 121 disposed at the center of the cable 12, a plurality of signal wires 123, and an insulating cover layer 125. The metal wire 121 provides a shapeable quality. Depending on the strength and extent of bending required, metal wire of different diameter and material can be used.

Next, a first fixing binder 14 is fixed to one end of the cable 12, and a second fixing binder 16 is fixed to the other end of the cable 12. The cable 12 is bent according to a predetermined curvature shape.

Figure 4:
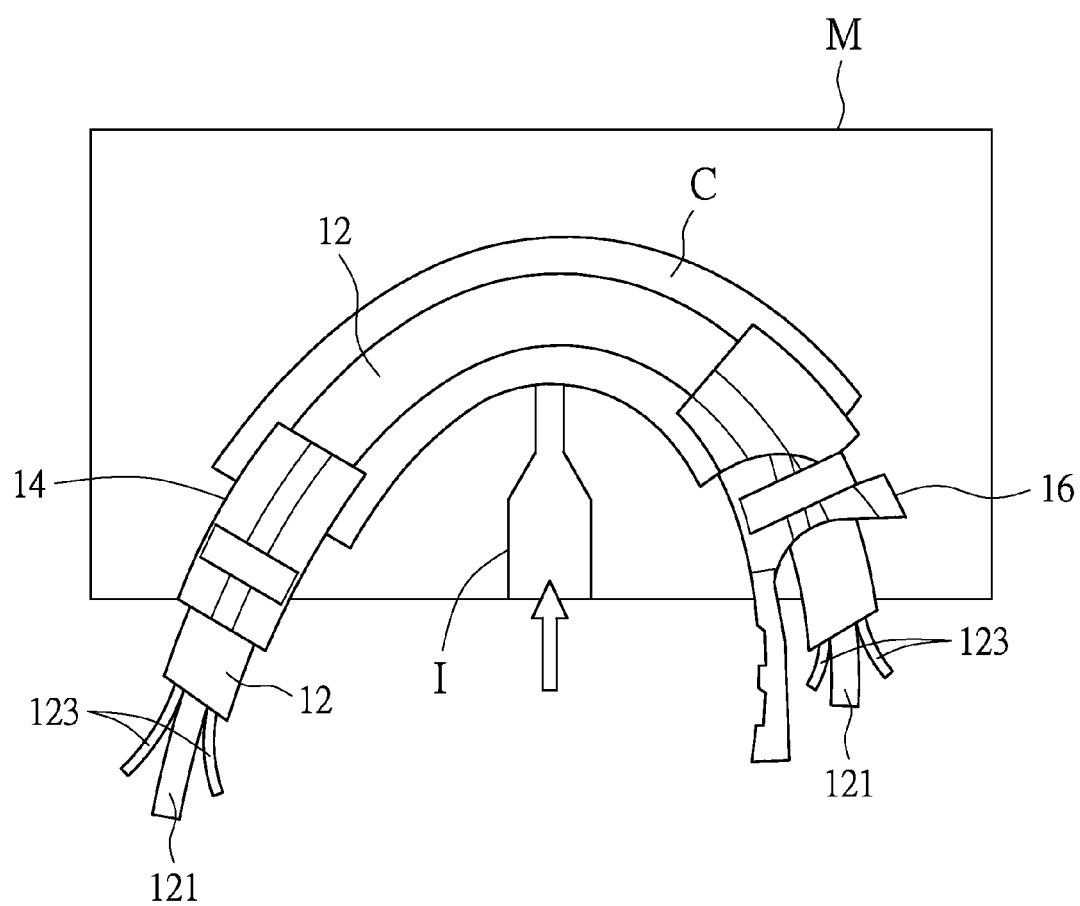
FIG. 4 is a schematic diagram of the flexible tube structure disposed in the flexible-tube mold according to the present disclosure.

As shown in FIG. 4, the cable 12, the first fixing binder 14 and the second fixing binder 16 are disposed into a flexible-tube mold M. The flexible-tube mold M is the mold for the flexible tube 10 for injection molding. The flexible-tube mold M has an outer layer-cavity C whose shape corresponds to the shape of the outer layer 18. The cable 12 is substantially disposed at the center of the outer-layer cavity C.

Then, inject melted plastic material into the outer-layer cavity C of the flexible-tube mold M to form the outer layer 18 enclosing the cable 12 and partially enclosing the first fixing binder 14 and the second fixing binder 16. During injection of melted plastic material, the rigidity of the cable 12 is increased by the metal wire 121 within. Sufficient support is provided (difficult to deform). The cable 12 is easily positioned within the outer-layer cavity C and can withstand the injection pressure during the injection molding process, such that the cable 12 does not shift toward an offset position at the surface of the product, affecting the appearance of the product. Therefore the flexible tube structure of the present disclosure does not need to form openings at the surface of the product to provide fixing units access to the cable 12 for holding the cable 12 in place during injection molding.

More specifically, the flexible-tube mold M has an injection gate I for the step of injecting plastic material in the flexible-tube mold M. The injection gate I is near the middle between the first fixing binder 14 and the second fixing binder 16. More properly, the injection gate I faces the inner side of the curvature of the cable 12. This arrangement places the injection force of the injected melted material in the middle of the cable 12. The forces on the two sides of the cable 12 are balanced, reducing offset of the cable 12 from the original position.

Figure 5:
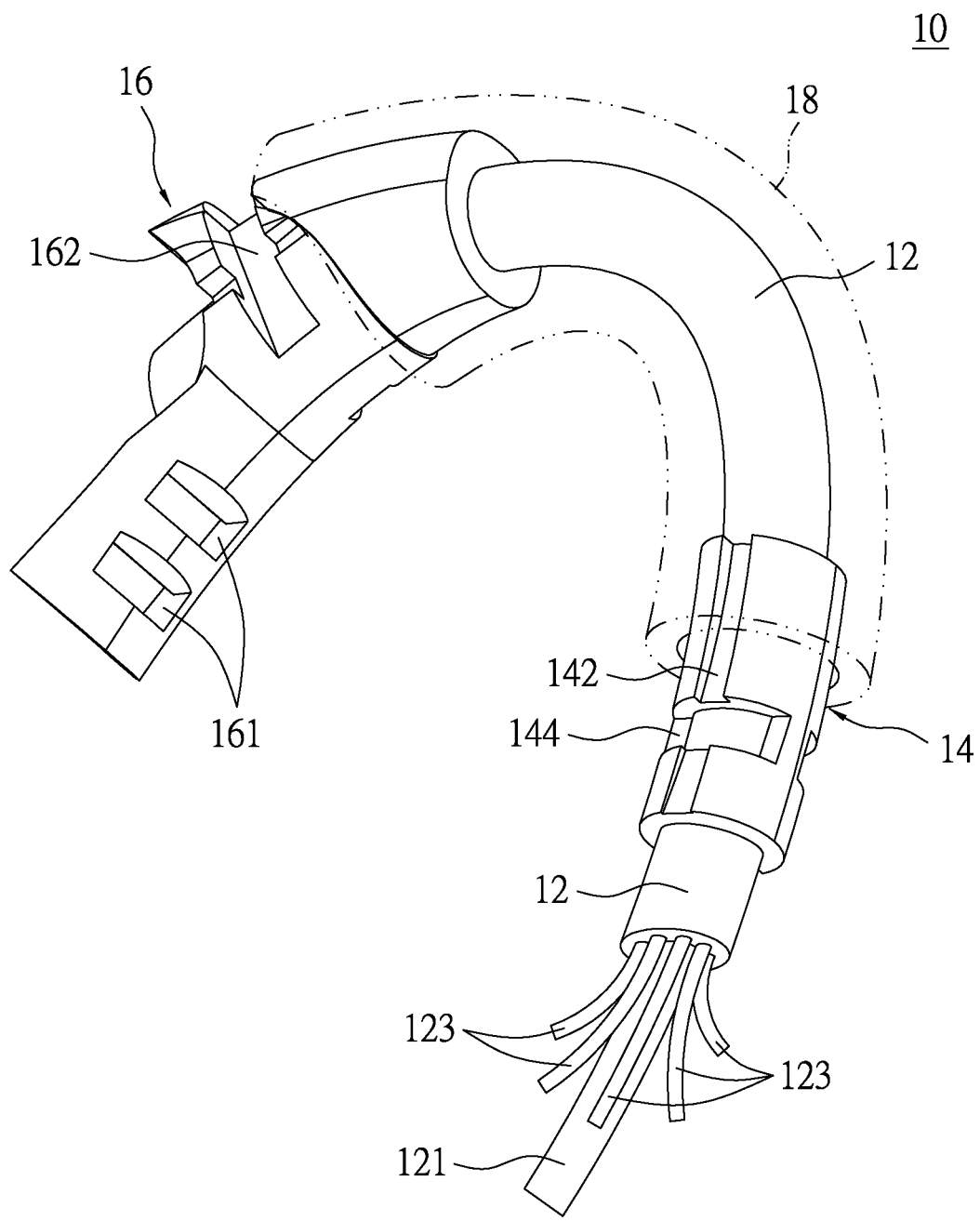
FIG. 5 is a schematic diagram of the flexible tube structure according to the present disclosure.

FIG. 5 is a schematic diagram of the flexible tube structure according to the present disclosure. The outer layer 18 is represented by dashed lines. In order to conform to the appearance of the wireless headset, section between the first fixing binder 14 and the second fixing binder 16 can have varying cross-sectional areas. For example, the cross-sectional area of the flexible tube 10 proximate the first fixing binder 14 is smaller, and the cross-sectional area of the flexible tube 10 proximate the second fixing binder 16 is larger. The outer layer 18 is part of the appearance of the product, and can be produced with different shapes and colors according to customer demands, e.g. having two colors by using co-mold to satisfy demands for electronic products with diverse appearances.

The first fixing binder 14 can further have at least one joining groove 142 for tightly joining with the outer layer 18 formed by injection of plastic material. Additionally, the first fixing binder 14 has at least one assembly groove 144 for coupling with the receiver 20. The second fixing binder 16 likewise has two assembly grooves for coupling with the transceiver 30. The assembly grooves 144, 161, 162 can also provide points of fixture for the flexible-tube mold M. Namely, a plurality of protruding blocks can be disposed in the flexible-tube mold M corresponding to the assembly grooves 144, 161, 162. When the flexible-tube mold M is closed, the protruding blocks respectively couple with the assembly grooves 144, 161, 162 for fixing the first fixing binder 14 and the second fixing binder 16.

Referring to FIG. 5, the present disclosure utilizes the cable 12 to provide a flexible tube structure which can be shaped by bending and transmits signals. Compared to prior techniques, the present disclosure does not form injection fixing holes on the flexible tube structure, and the outer layer 18 of the flexible tube 10 has an intact appearance without any holes. Additionally, no human labor is required to pass the cable 12 through the interior of the flexible tube structure, saving labor, reducing cost, and saving the cost of hollow fixture molds required by the hollow flexible tube of conventional methods.

The present disclosure designs in a limited space a flexible tube structure which can be shaped by bending and transmits signals, creating uniqueness and raising competitiveness and value of the product. Application of the flexible tube structure which can be shaped by bending and transmits signals is not limited to wireless ear-hook headsets, sports and medical electronic products. Moreover, the predetermined curvature shape is not limited to the shape of the human ear, and can be applied on two electronic devices transmitting signals therebetween and providing curved shaping.

The descriptions illustrated supra set forth simply the preferred embodiments of the present disclosure; however, the characteristics of the present disclosure are by no means restricted thereto. All changes, alternations, or modifications conveniently considered by those skilled in the art are deemed to be encompassed within the scope of the present disclosure delineated by the following claims.

What is claimed is:

1. A wireless ear-hook headset, comprising:
   a flexible tube, including:
      a cable, having at least one shapeable metal wire, a plurality of signal wires proximal to the metal wire, and an insulating cover layer enclosing the signal wires;
      a first fixing binder, fixed to one end of the cable;
      a second fixing binder, fixed to the other end of the cable;
      an outer layer, having two ends respectively connected to the first fixing binder and the second fixing binder, and enclosing the cable;
   a receiver, connected to the first fixing binder of the flexible tube; and
   a transceiver, connected to the second fixing binder of the flexible tube.

2. The wireless ear-hook headset according to claim 1, wherein the metal wire is a dummy line without signal-transmitting ability.

3. The wireless ear-hook headset according to claim 2, wherein the metal wire is made of shape memory alloy.

4. The wireless ear-hook headset according to claim 1, wherein the metal wire is an antenna.

5. The wireless ear-hook headset according to claim 1, wherein the cross-sectional areas of the flexible tube between the first fixing binder and the second fixing binder are non-uniform.

6. A flexible tube structure of wireless ear-hook headset for signals-transmitting between a receiver and a transceiver, comprising:
   a cable, having at least one shapeable metal wire, a plurality of signal wires proximal to the metal wire, and an insulating cover layer enclosing the signal wires;
   a first fixing binder, fixed to one end of the cable;
   a second fixing binder, fixed to the other end of the cable; and
   an outer layer, having two ends respectively connected to the first fixing binder and the second fixing binder, and enclosing the cable.

7. The flexible tube structure of wireless ear-hook headset for signals-transmitting between a receiver and a transceiver according to claim 6, wherein the metal wire is a dummy line without signal-transmitting ability.

8. The flexible tube structure of wireless ear-hook headset for signals-transmitting between a receiver and a transceiver according to claim 7, wherein the metal wire is made of shape memory alloy.

9. The flexible tube structure of wireless ear-hook headset for signals-transmitting between a receiver and a transceiver according to claim 6, wherein the metal wire is an antenna.

10. The flexible tube structure of wireless ear-hook headset for signals-transmitting between a receiver and a transceiver according to claim 6, wherein the cross-sectional areas of the flexible tube between the first fixing binder and the second fixing binder are non-uniform.

11. A method of manufacturing a flexible tube structure of wireless ear-hook headset for signals-transmitting between a receiver and a transceiver, comprising the following steps:
   providing a cable, including at least one metal wire, a plurality of signal wires proximal to the metal wire, and an insulating cover layer enclosing the signal wires;
   fixing a first fixing binder to one end of the cable;
   fixing a second fixing binder to the other end of the cable;
   bending the cable according to a predetermined curvature shape;
   disposing the first fixing binder and the second fixing binder in a flexible-tube mold; and
   injecting plastic material in the flexible-tube mold to form an outer layer enclosing the cable and partially enclosing the first fixing binder and the second fixing binder.

12. The method of manufacturing a flexible tube structure of wireless ear-hook headset for signals-transmitting between a receiver and a transceiver according to claim 11, wherein the metal wire is made of a shape memory alloy.

13. The method of manufacturing a flexible tube structure of wireless ear-hook headset for signals-transmitting between a receiver and a transceiver according to claim 11, wherein the metal wire is an antenna.

14. The method of manufacturing a flexible tube structure of wireless ear-hook headset for signals-transmitting between a receiver and a transceiver according to claim 11, further comprising forming non-uniform cross-sectional areas of the flexible tube structure between the first fixing binder and the second fixing binder.

15. The method of manufacturing a flexible tube of wireless ear-hook headset for signals-transmitting between a receiver and a transceiver according to claim according to claim 11, wherein the predetermined curvature shape of the cable conforms to the curvature of a human ear.

16. The method of manufacturing a flexible tube of wireless ear-hook headset for signals-transmitting between a receiver and a transceiver according to claim 11, wherein the flexible-tube mold has an injection gate for the step of injecting plastic material in the flexible-tube mold, the injection gate is near the middle between the first fixing binder and the second fixing binder, and the injection gate faces toward the inner side of the curvature of the cable.

* * * * *